May 22, 1945. H. ZIEBOLZ 2,376,844
CENTRIFUGAL SPEED GOVERNOR
Filed Oct. 20, 1942
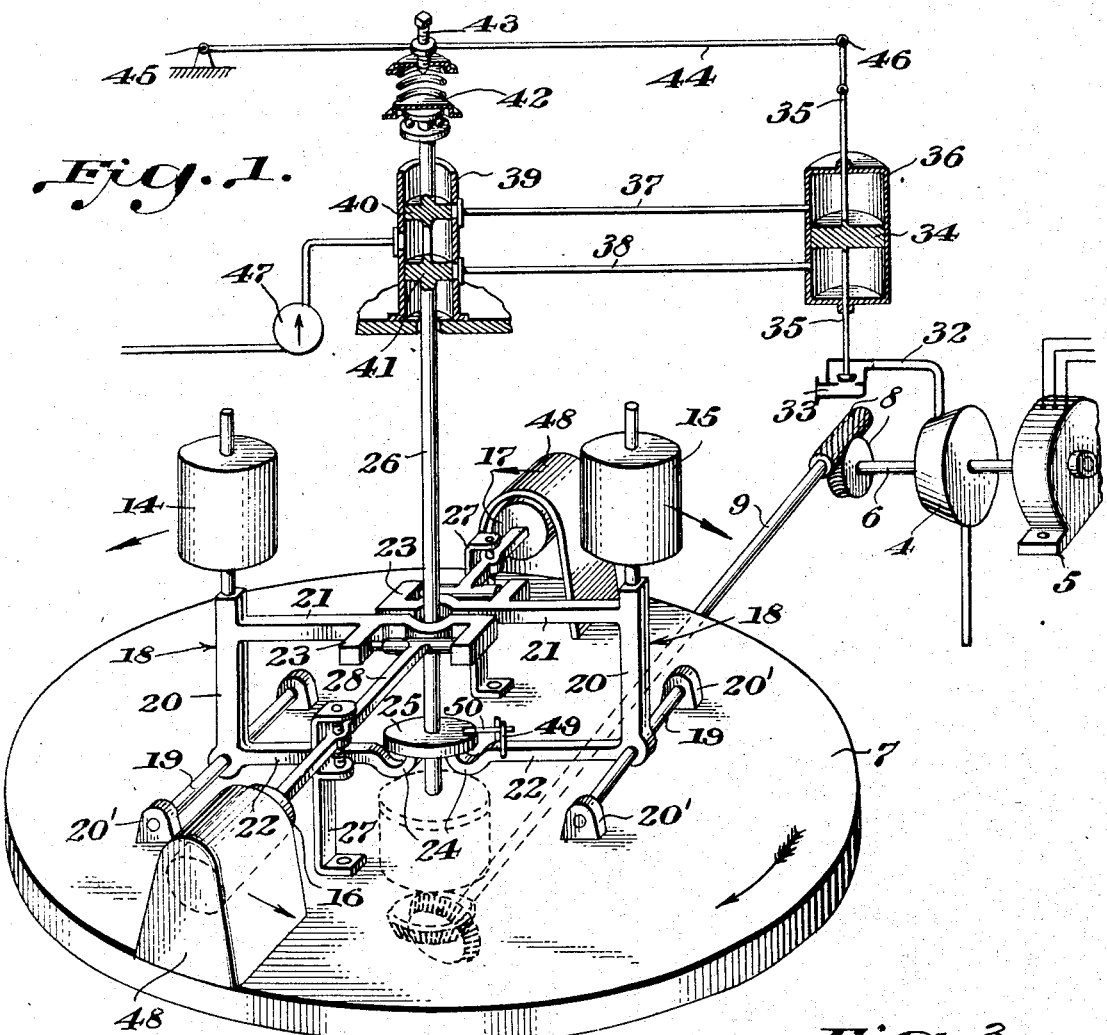
Fig. 1.
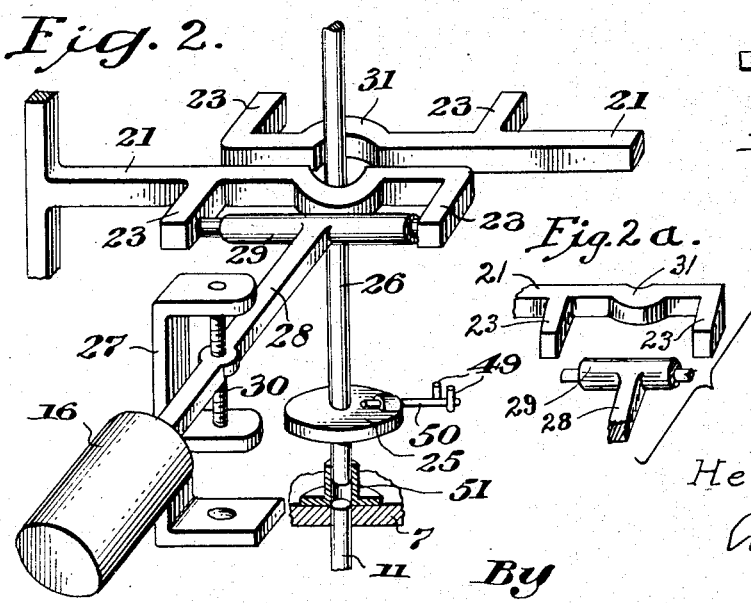
Fig. 2.
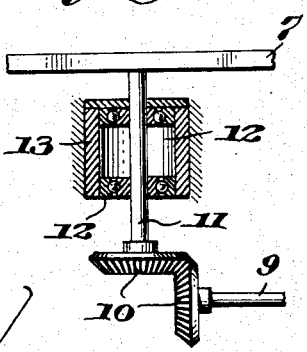
Fig. 3.
Fig. 2a.
Inventor,
Herbert Ziebolz
By A. D. Adams
atty.

Patented May 22, 1945

2,376,844

UNITED STATES PATENT OFFICE 2,376,844

CENTRIFUGAL SPEED GOVERNOR

Herbert Ziebolz, Chicago, Ill., assignor to Askania Regulator Company, Chicago, Ill., a corporation of Illinois Application October 20, 1942, Serial No. 462,725

5 Claims. (Cl. 264—6)

This invention relates to a centrifugal speed governor for use in controlling the speed of various machines and devices, such as a steam turbine driving a generator at constant speed. It is an aim of the invention to provide a specific type of centrifugal governor, having centrifugal weights creating forces balanced against a biasing force and measuring deviations of the centrifugal forces from a given value to control the speed of a prime mover, with additional inertia means adding forces to counteract the biasing spring. The inertia forces are a function of the rate of speed change of the prime mover. It is a further aim of the invention to provide a centrifugal speed governor with interconnected inertia initiated forces whereby the mechanism of the governor will add or deduct these inertia forces to the centrifugal forces of the centrifugal weights by a particular type of connecting means.

Other aims and advantages of the invention will appear in the specification, when considered in connection with the accompanying drawing, wherein:

Fig. 1 is a perspective view of the governor and the control and controlled elements;

Fig. 2 is a perspective view of a part of the governor on an enlarged scale;

Fig. 2ª is an exploded perspective view of two elements shown in Fig. 2; and

Fig. 3 is a part sectional and part side elevation of the governor plate and its support and drive.

By way of example, the governor is shown as controlling the speed of a prime mover or turbine 4 connected to operate a generator 5. A turbine shaft 6 is connected to rotate a governor plate or disk 7 by means of worm gears 8, shaft 9, bevel gears 10 and axle shaft or spindle 11. The latter is suitably supported in ball bearings 12 secured in a stationary or fixed element 13.

The governor comprises centrifugal weights 14 and 15 and inertia weights 16 and 17, the weights 14 and 15 being each mounted on a frame 18 pivotally mounted by means of a shaft 19 in a pair of lugs 20'. The lugs 20' are secured to or are integral with the plate or support 7. Each frame 18 is composed of a main stem 20 with two spaced parallel arms 21 and 22. Each arm 21 is provided with a fork member 23 and each arm 22 terminates in a curved portion 24 which contacts the underside of a disk 25 mounted on a control rod 26.

Each inertia weight 16, 17 is pivotally mounted in a bracket 27 to swing horizontally, the brackets 27 being secured on the plate 7. As shown in Fig. 2, each inertia weight is mounted on the end of a lever 28, the inner ends or fingers 29 bearing against the inner faces of the forks 23 on the respective arms 21, as will be evident from inspection of Fig. 2ª. Each lever 28 is mounted on a vertical pin or rod 30 which latter is supported in its respective bracket 27. The ends 29 are in sliding contact with the opposed inner faces of the forks 23, so that the forks are free to be moved by the centrifugal weights 14.

Each fork 23 is provided with an intermediate curved portion 31 to accommodate the control rod 26.

The steam for the turbine 4 is supplied through pipe 38 under the control of a valve 33. This valve 33 is adjusted by means of a piston 34 and rod 35, the piston being provided in a cylinder 36 having two pipes 37 and 38 connected thereto to opposite sides of the piston. The pipes 37 and 38 are in communication with a pilot valve 39 in which a double piston 40 and 41 is slidably arranged. Each piston valve 40 and 41 is adapted to close or throttle pipes 37 and 38, respectively. The piston valves 40 and 41 are spaced from each other and are mounted on the upper end of the control rod 26. A biasing or compression spring 42 bears at one end on the piston rod 26 and the other end 43 on a rod 44. This rod 44 is pivoted at one end to a fixed point 45 and the other end 46 is linked to the end of the piston rod 35.

Hydraulic or air pressure is supplied by a pump 47 to the piston valve 39 and thence to the control piston 34 for adjustment of the valve 33.

It is desirable to provide a hood or shield 48 over each inertia weight 16, 17 to prevent air resistance from affecting the proper operation of the weights. It may also be desirable to prevent the rod 26 from turning relative to plate 7, in which case stops 49 are provided on one of the arms 22 and a rod 50 is secured to the disk 25 to be held by these stops.

As seen in Fig. 2 the end of the rod 26 is guided and slides in a socket bearing member 51 secured on the plate 7. The centrifugal forces created by the weights 14 and 15 are transmitted to the disk 25. If the latter is provided with ball bearings (not shown), on the under surface thereof, it is possible to have rod 26 and pistons 40 and 41 non-rotary. However, rotation of rod 26 and piston valves 40 and 41 is desirable, since rotation of the valves decreases vertical frictional resistance and thereby increases the sensitivity. As the centrifugal forces increase, they overcome the action of the biasing spring 42 and thus slightly move the pistons 40 and 41 upwardly to permit oil from the pump 47 to enter the upper part of the operating cylinder 36. This will result in the piston 34 moving downwardly to move the valve 33 toward closing position to reduce the speed of the turbine 4. The piston 34, as it moves downwardly, increases the force of the spring 42 to overcome the higher speed impulse. During the operation of the governor, as described, the mechanism will add or deduct the inertia forces, created by the weights 18 and 17, to or from the centrifugal forces created by the weights 14 and 15. The inertia forces are dependent upon the inertia masses 16 and 17 and the lengths of their lever arms. By changing the ratio of the weights 14 and 16 and the transmitting lever arms, it is possible to vary, within wide ranges, the relative magnitude of the speed and rate of speed change component. Thus, it is possible to choose a ratio of the two forces most suitable for the individual control problem. The governor may be made extremely sensitive to the rate of speed change and will act before major changes in speed occur. The arrangement also tends to avoid "hunting."

In Fig. 1 the arrow on the disk 7 indicates the direction of rotation of the governor and the arrows for the weights 14, 15, 16 and 17 indicate the direction of the forces. If the speed increases, the weights 14 and 15 tend to move, as indicated by their arrows. If this increase in speed is fast (rate of change), the weights 16 and 17 tend to lag behind and, therefore, their inertia forces are added to the weights 14 and 15, that is, it increases the tendency of the weights 14 and 15 to turn in the directions indicated by their arrows. If the turbine 4 is slowed down weights 16 and 17 attempt to continue to move at the previous speed; therefore, the effect of the inertia weights 16 and 17 is deducted from that of the centrifugal weights 14 and 15.

In the operation of the governor, it will be understood that the fly-balls 14—15 produce a vertical force tending to displace the shaft 26. Now, if the disk 7 is accelerated, the inertia weights 16—17 have a tendency to continue their previous rate of rotation with the result that inertia forces are created, which are measured by the mass, times the angular acceleration, times the radius; or the moment of inertia, times the angular acceleration, divided by the distance. The inertia force is exerted horizontally, but it is converted into a vertical force, acting on the valve stem 26 through the forks 23 and the levers 20—22. Thus, the inertia force is added, algebraically, to the centrifugal force, without any appreciable friction. In practice, the vertical movement of the valve stem or rod 26 is only a small fraction of an inch, and it will be understood that the fingers 29 on the arm or lever 28 cannot become disengaged from the forks 23 on the lever arm 21.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A centrifugal governor comprising a disk adapted to be rotated by a machine to be regulated; a pair of weights responsive to centrifugal force; a pair of additional weights responsive to inertia forces; a frame for pivotally mounting each centrifugal weight on the disk and capable of swinging radially thereon upon rotation of the disk; and a lever for mounting each inertia weight on the disk to swing in a plane parallel to the plane of the disk and connected by a sliding abutment to its respective centrifugal weight frame to add the inertia force to or deduct it from the centrifugal force.

2. A centrifugal governor according to claim 1, in which a control rod is connected to be operated in response to movements of the centrifugal weight frames.

3. A centrifugal governor according to claim 1, in which each centrifugal weight frame is provided with a fork member acting as the abutment connection to its respective inertia weight lever.

4. A centrifugal governor comprising a disk adapted to be rotated by a machine to be regulated; a pair of weights responsive to centrifugal force; a frame for each weight pivotally mounted on the disk to which the weight is connected so that it is capable of swinging radially on and in a plane perpendicular to the disk; a pair of additional weights responsive to inertia forces; a lever for each inertia weight and slidably connected to its respective centrifugal weight frame; and a bracket mounted on the disk for each inertia weight to rotatably mount each lever to swing in a plane parallel to the plane of rotation of the disk, said inertia weights adding their forces to or deducting them from the centrifugal weight forces.

5. A centrifugal governor according to claim 4, in which a fork member is provided on each frame to which its respective lever is slidably connected.

HERBERT ZIEBOLZ.